C. N. A. VOSS.
Fishing Apparatus.
No. 216,242.  Patented June 3, 1879.
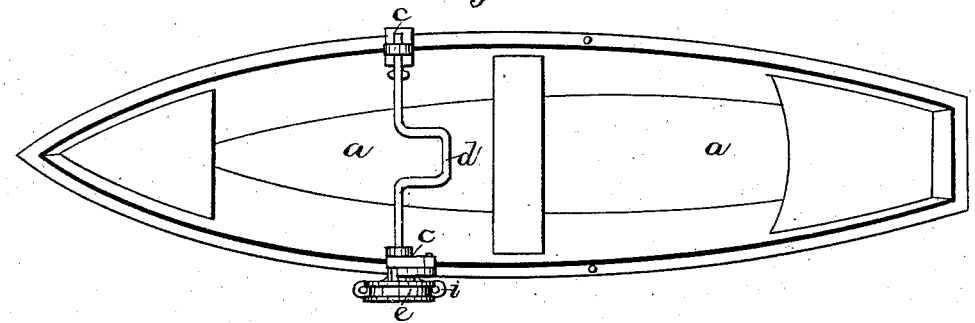
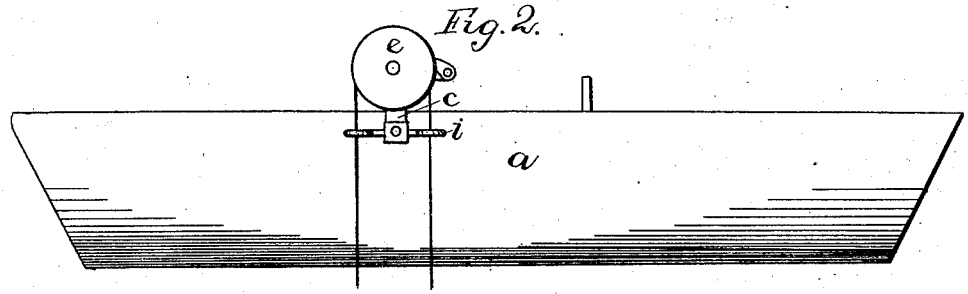
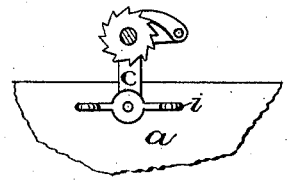
Witnesses:
J. W. Garner
W. S. D. Haines
Inventor:
C. N. A. Voss
per
F. A. Lehmann,
atty

UNITED STATES PATENT OFFICE.

C. N. ADOLPH VOSS, OF GLOUCESTER, MASSACHUSETTS.

IMPROVEMENT IN FISHING APPARATUS.

Specification forming part of Letters Patent No. 216,242, dated June 3, 1879; application filed April 12, 1879.

*To all whom it may concern:*

Be it known that I, CARL NECOLAUS ADOLPH VOSS, of Gloucester, in the county of Essex and State of Massachusetts, have invented certain new and useful Improvements in Fishing Apparatus; and I do hereby declare the following to be a full, clear, and exact description of the invention, such as will enable others skilled in the art to which it pertains to make and use it, reference being had to the accompanying drawings, which form part of this specification.

My invention relates to an improvement in fishing apparatus; and it consists in the combination of suitable clamps and a cranked shaft having a drum on its end, whereby the trawls can be rapidly and easily drawn into the dory, as will be more fully described hereinafter.

Figure 1 is a plan view of my invention. Fig. 2 is a side view of the same, and Fig. 3 a detail view.

$a$ represents a common dory or fishing-boat, and $c$ are two common holding-clamps, which fit down over the top edge of the dory at any desired place. Passing through the tops of these clamps is the cranked shaft $d$, which has a drum, $e$, of any desired size, rigidly fastened to one end, so as to come out over the side of the boat. The end of the shaft having the drum on it is fastened to its clamp, so that it cannot be moved endwise; but the other end of the shaft slips freely through its clamp, for the purpose of allowing the apparatus to be lengthened or shortened, according to the part of the boat to which it is to be attached. To the outer side of the clamp, at the end of the shaft to which the drum is secured, is fastened the guide $i$, which has its ends bent almost into circles, so as to hold the line that is being drawn in always in the same relation to the drum as the boat is being moved around and about by the waves.

The operation of my apparatus is as follows: The line or trawl is first caught in one of the hooked ends of the guide, and is then wrapped once or twice around the drum to keep it from slipping. One man then turns the cranked shaft and winds the line in, while the other man coils the trawl as it is wound, and holds the turn around the drum.

Were it not for the guide the trawl could not be wound on the drum, as the motion of the boat would present the drum at all sorts of angles to it.

A single clamp and a cranked shaft may be used instead of two clamps, if so preferred.

Upon one side of the boat, next to the drum, there will be placed a pawl, which will catch in a ratchet on the shaft or drum, and thus hold the trawl at any desired place.

Having thus described my invention, I claim—

The combination of the boat $a$, cranked shaft $d$, having the drum $e$, secured to one end outside of the boat, clamps $c$, and guide $i$, the guide being secured to one of the clamps outside of the boat, substantially as set forth.

In testimony that I claim the foregoing I have hereunto set my hand this 8th day of April, 1879.

C. N. A. VOSS.

Witnesses:
M. L. WETHERELL,
HENRY CENTER.